(12) United States Patent
Kim

(10) Patent No.: US 6,317,219 B1
(45) Date of Patent: Nov. 13, 2001

(54) METHOD AND APPARATUS FOR COMPENSATING FOR A DISTORTION BETWEEN BLOCKS OF A SCANNED IMAGE

(75) Inventor: Han-Sin Kim, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/162,136

(22) Filed: Sep. 29, 1998

(30) Foreign Application Priority Data

Sep. 29, 1997 (KR) .................................. 97-49529

(51) Int. Cl.⁷ .................................. G06G 15/04
(52) U.S. Cl. .............................. 358/1.2; 358/1.9
(58) Field of Search .................... 382/275, 298; 358/1.2, 449–451, 528, 1.9

(56) References Cited

U.S. PATENT DOCUMENTS 4,404,590 * 9/1983 Mayer et al. ................. 358/106
5,309,205 * 5/1994 Hayano ....................... 355/243

FOREIGN PATENT DOCUMENTS

04131266 * 5/1992 (JP) .

* cited by examiner

Primary Examiner—Thomas D. Lee
Assistant Examiner—Stephen Brinich
(74) Attorney, Agent, or Firm—Robert E. Bushnell, Esq.

(57) ABSTRACT

A method and apparatus for compensating for inter-block distortion of a scanned image prevents duplicate images between blocks from being read in an overlapped condition and from being read in a gapped condition (data omission) when an image is scanned by being divided into a number of blocks. The method and apparatus include the steps and functions of: scanning a reference pattern having a vertical dimension made up of a number of dots which is fewer than a number of pixels of an optical sensor; calculating a magnification factor of a scanner module by comparing the vertical dimension of a scanned image with that of the reference pattern; and correcting an image distortion occurring between adjacent image blocks using the relative sizes or dimensions of the scanned image and the reference pattern. The calculating step is performed in accordance with $N(y/x)$, where $y$ is a number of dots representing the vertical size of the scanned image, $x$ is a number of dots representing the vertical size of the reference pattern, and $N$ is the pixel number of the scanner. The correcting step compensates for distortion occurring between adjacent image blocks by using the calculated magnification factor to perform selective image-processing on scanning data, or by adjusting a drive quantity of a line feed motor to control a transfer distance of an object being scanned, with the drive quantity being calculated in accordance with $N(x/y)$.

30 Claims, 2 Drawing Sheets

METHOD AND APPARATUS FOR COMPENSATING FOR A DISTORTION BETWEEN BLOCKS OF A SCANNED IMAGE

CLAIM OF PRIORITY

This application makes reference to, incorporates the same herein, and claims all benefits accruing under 35 U.S.C. § 119 from my application entitled Image Quality Compensation Device and Method Using a Shuttle Scanner filed with the Korean Industrial Property Office on Sep. 29, 1997 and there duly assigned Serial No. P97-49529 by that Office.

BACKGROUND OF THE INVENTION

1. Technical Field

The present invention relates to a shuttle scanner and, more particularly, to a method and apparatus for compensating for image distortion of a shuttle scanner in which a scanned reference pattern is used to correct inter-block distortion caused by the magnification error of a scanner module.

2. Related Art

Recently, multi-tasking systems that combine the various functions of a printer, a facsimile machine, a copy machine, a scanner, etc., have been developed. In combining scanner functions with those of a printer, a shuttle-type scanner using a shuttle scanner module is typically employed. The shuttle scanner module travels across a sheet of paper together with the ink cartridge, using the same driving system as that of the print head module, and the paper is fed using a line feed motor (stepper motor). A shuttle scanner, however, has its own unique set of problems in performing a scanning operation.

For example, in scanning an object using a shuttle scanner module, the scanned object is divided into shuttle blocks. In that process, inter-block image distortion can occur, whereby duplicate image portions are scanned into adjacent blocks and are then overlapped, or whereby a gap occurs between adjacent block. This problem results from magnification error which, in turn, results from assembly tolerance errors occurring during the scanner assembly or manufacturing process.

Therefore, there is a need for the development of a method and apparatus for correcting image distortion occurring between adjacent image blocks caused by shuttle scanning involving division of a scanned object into a number of blocks.

SUMMARY OF THE INVENTION

Accordingly, in order to overcome such drawbacks in the art, it is an object of the present invention to correct image distortion occurring between adjacent image blocks caused by a shuttle scanner scanning by dividing an object to be scanned into a number of blocks.

It is another object of the present invention to calculate a magnification adjustment error due to an assembly allowance of a scanner module.

It is another object of the present invention to control the drive quantity of a line feed motor according to the calculated magnification error.

It is another object of the present invention to perform image compensation by determining a valid image data acquisition area of scanning data using the calculated error value of the necessary magnification adjustment.

To achieve these and other advantages and in accordance with the purpose of the present invention, as embodied and broadly described, there is provided a method and apparatus for compensating for inter-block image distortion in a shuttle scanner. The method and apparatus include the steps of and means for: scanning a reference pattern having a predetermined vertical dimension; calculating a magnification factor of a scanner module by comparing the vertical dimension of a scanned image with that of the reference pattern; and correcting image distortion occurring between adjacent image blocks using the relative sizes of the scanned image and a reference pattern.

According to one aspect of the present invention, the correcting step uses the calculated magnification factor to perform selective image-processing on scanning data.

According to another aspect of the present invention, the correcting step adjusts a drive quantity of a line feed motor to control a transfer distance of an object being scanned.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar- components, wherein.

DETAILED DESCRIPTION OF PREFERRED EMBODIMENT

Figure 1:
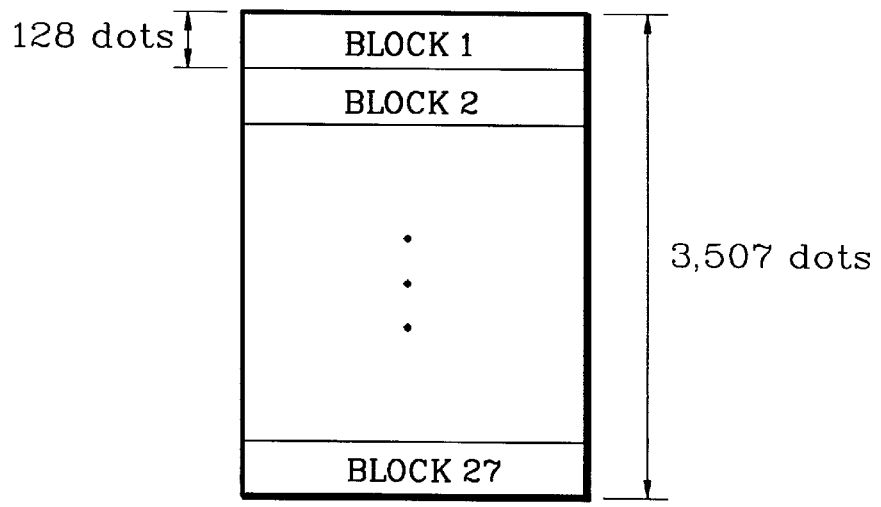
FIG. 1 is a diagram showing the division of a scanned object into a number of blocks.

As shown in FIG. 1, in scanning an object (e.g., an original document ) using a shuttle scanner module, scanning is performed by dividing the scanned object into 22~27 shuttle blocks, depending on the dimensions of the scanner module. That is, assuming an A4-size sheet of paper is scanned at a resolution of 300 dpi, there are a total of 3,507 lengthwise dots available along the paper feed path, so that a scanner module having a size (pixel number) of 128 dots would result in a division of the sheet into 27 blocks. In dividing an object to be scanned into blocks, an inter-block image distortion phenomenon occurs whereby duplicate image portions are scanned into adjacent blocks and are then overlapped, or whereby a gap occurs between adjacent blocks. This problem results from an error in magnification, which occurs during the manufacture of the scanner module itself due to ordinary assembly tolerances. Accordingly, the degree of magnification is set during scanner module assembly.

Figure 2:
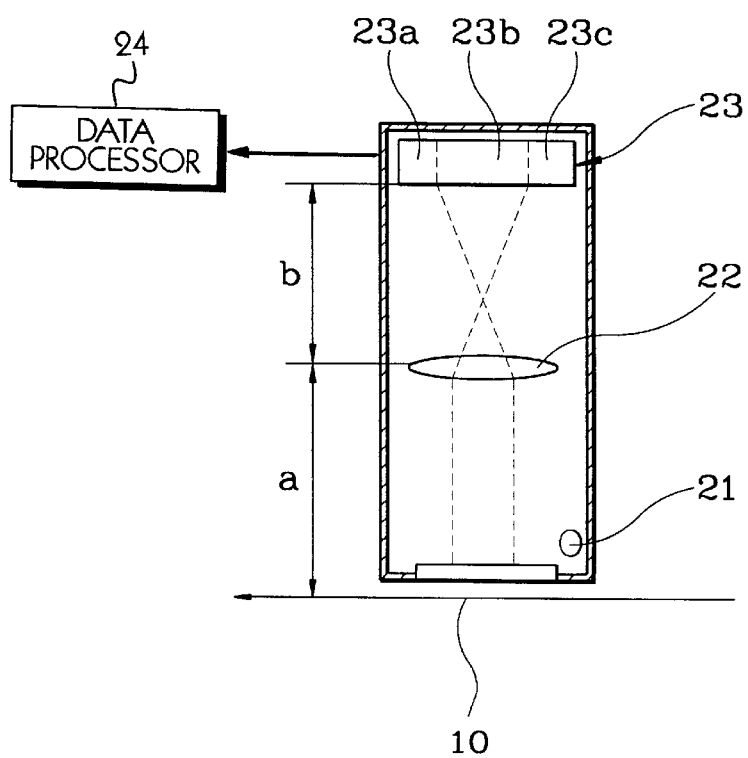
FIG. 2 is a section view illustrating a shuttle scanner module.

As shown in FIG. 2, a typical shuttle scanner module includes a lamp 21 to illuminate an object 10 by radiating visible light, a lens 22 to adjust (set) the focus of the light of the lamp reflected from the object to be scanned and incident to the scanner module, and an optical sensor 23 (such as a charge-coupled device) to form an image by receiving the light passed through the lens 22. An active cell portion 23*b* of the optical sensor 23, which is determined by the relative positioning of the lens 22, receives real image data while inactive cell portions 23a and 23c are ineffective. The image data output from the optical sensor 23 is synchronized with clock pulses so as to set the start and end points of the scanning data using an on-board data processor 24.

In the above device, the magnification factor is determined by the relationship between the lens 22 and optical sensor 23, and their relative placement with respect to the object 10 being scanned. That is, if the distance from the reflecting surface of the object 10 to the lens 22 is a value a, and the distance from the lens 22 to the receiving surface of the optical sensor 33 is a value b, the magnification factor is calculated as: b/a. This factor is set during the assembly of the scanner module by changing the position of the lens 32.

Therefore, distortion occurs in the read (scanned) image due to an error in the magnification adjustment which takes place during scanner module assembly. This distortion consists of an overlapping of duplicate image data and/or an omission of image data in the border areas between adjacent blocks.

Figure 3:
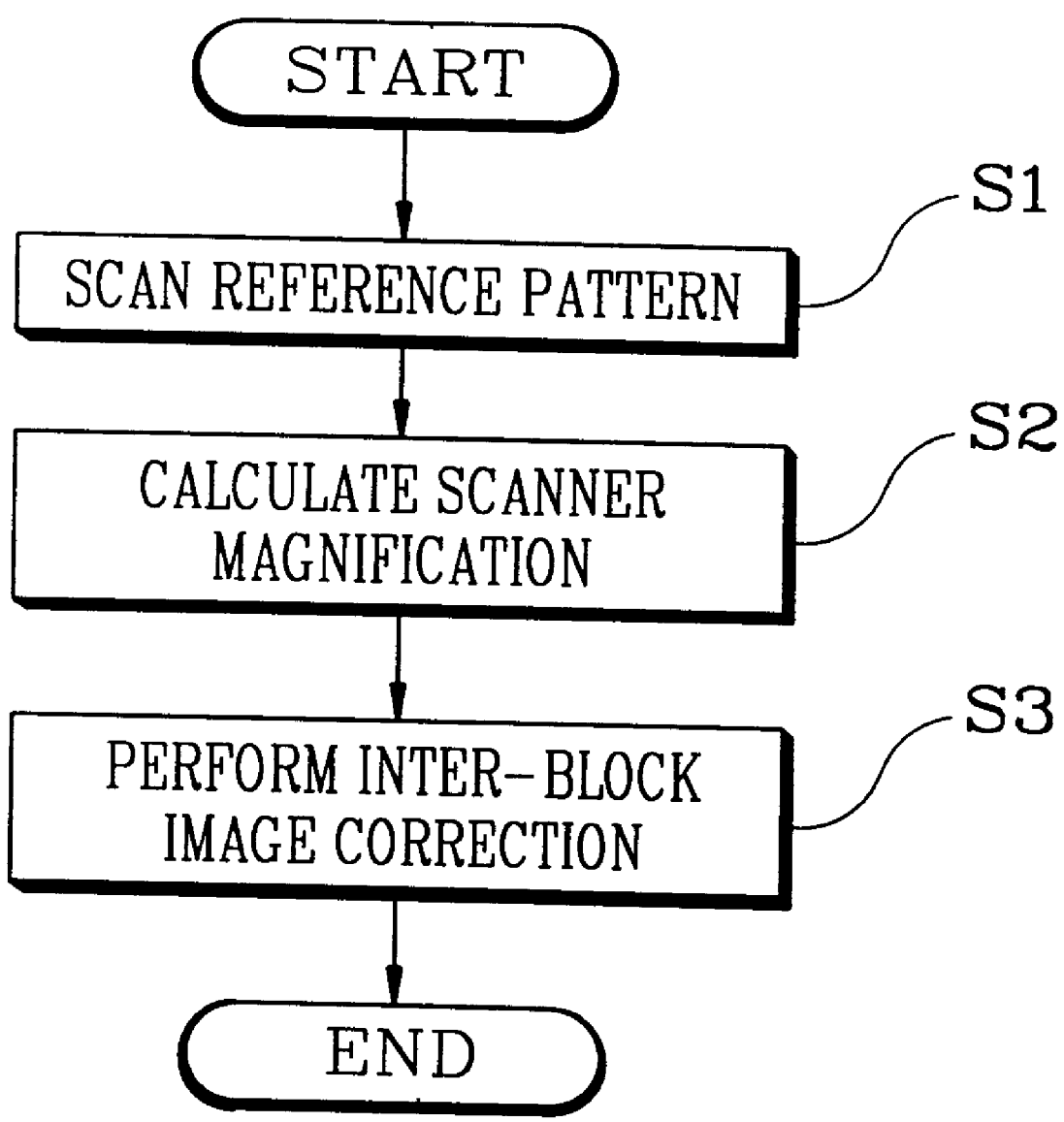
FIG. 3 is a flow chair of a method for compensating for distortion occurring between blocks of a scanned image, according to the present invention.

Referring to FIG. 3, a reference pattern having a known vertical dimension (size) is scanned in step S1. That is, a contrasting pattern formed on a reference object to be scanned is initially scanned using an assembled scanner module (i.e., one bearing a degree of assembly tolerance). The reference pattern is made up of a predetermined number of dots arranged vertically (i.e., along the paper feed path). In order to establish a practical range of measurement of magnification, the number of dots should be significantly less than the pixel number (e.g., 128) of the optical sensor. In the example of the present invention, the reference pattern has a vertical size of 100 dots.

In step S2, the degree of magnification of the scanner is calculated by comparing of the detected size of a scanned image with that of the reference pattern. That is, assuming the size of the reference pattern to be a value x, the size of an actually scanned image to be a value y, and the pixel number to be a value N, the scanner's magnification can be calculated as: N(y/x). For example, if the reference pattern is 100 dots and the scanned image is detected as 97 dots, the image is being magnified by 100/97 times.

In step S3, a given block interval of the scanned object is corrected using the above ratio in determining magnification (i.e., the relative sizes of the scanned image and reference pattern). The present invention can be implemented using either of the following two methods for performing inter-block image correction.

In the first method, assuming the drive quantity of a line feed motor (not shown) is set to 128/300 inches for controlling a transfer distance between blocks, only 124 pixels (which is a truncated approximation of 128×(97/100) pixels) are processed as image data. Then, corrective programming is performed using the on-board data processor 24 and applicable software in accordance with the following equation:

$$E = S + N\left(\frac{x}{y}\right) - 1 + \alpha$$

where E is the end point of the processed image, S is the start point of the image being scanned, y is a number of dots representing the vertical size of a scanned image, x is a number of dots representing the vertical size of a reference pattern, N is the pixel number of the optical sensor of a scanner, and α is a compensating value according to the scanner's drive delay.

In the second method, the drive quantity of a line feed motor (not shown) is adjusted according to a calculated magnification factor. That is, for a reference pattern size of 100 dots and scanned image of 97 dots, which results in a magnification factor of 100/97, a one-block transfer distance of the line feed motor is calculated as: N(x/y).

As described in the above, the present invention has the effect of compensating for image distortion occurring between blocks due an error in magnification resulting from an assembly tolerance. Such compensation for image distortion results from programming on-board data image processor or by adjusting a drive quantity of a line feed motor (not shown) for travel over the scanned object.

It will be apparent to those skilled in the art that various modifications can be made in a method for compensating for a distortion between blocks of a scanned image of the present invention, without departing from the spirit of the invention. Thus, it is intended that the present invention cover such modifications as well as variations thereof, within the scope of the appended claims and their equivalents.

What is claimed is:

1. A method for compensating for inter-block image distortion in a shuttle scanner having a scanner module, comprising the steps of:

scanning a reference pattern;

calculating a magnification factor of the scanner module by comparing a scanned image with the reference pattern; and correcting image distortion occurring between adjacent image blocks using relative sizes of the scanned image and the reference pattern;

wherein the magnification factor is calculated in accordance with the following equation:

$$E = S + N\left(\frac{x}{y}\right) - 1 + \alpha$$

where E is an end point of a processed image, where S is a start point of the scanned image, where y is a number of dots representing a vertical dimension of the scanned image, where x is a number of dots representing a predetermined vertical dimension of the reference pattern, where N is a pixel number of an optical sensor of the scanner module, and where α is a compensating value according to a drive delay of the scanner.

2. The method as claimed in claim 1, wherein a number of dots making up the predetermined vertical dimension of the reference pattern is fewer than a number of pixels of an optical sensor in the scanner module.

3. The method as claimed in claim 1, wherein said calculating step is performed in accordance with N(y/x), where y is a number of dots representing the vertical dimension of the scanned image, where x is a number of dots representing the predetermined vertical dimension of the reference pattern, and where N is a pixel number of the scanner.

4. The method as claimed in claim 1, wherein said correcting step uses the calculated magnification factor to perform selective image-processing on scanning data, whereby to compensate for the image distortion occurring between the adjacent image blocks.

5. The method as claimed in claim 1, wherein the drive quantity is calculated in accordance with N(x/y), where y is a number of dots representing the vertical dimension of the scanned image, where x is a number of dots representing the predetermined vertical dimension of the reference pattern, and where N is a pixel number of the scanner.

6. The method as claimed in claim 1, wherein said correcting step adjusts a drive quantity of a line feed motor to control a transfer distance of the scanned object, whereby to compensate for the image distortion occurring between the adjacent image blocks.

7. An apparatus for compensating for inter-block image distortion in a shuttle scanner having a scanner module, comprising:

scanning means for scanning a reference pattern;

calculating means for calculating a magnification factor of said scanning means by comparing a scanned image with the reference pattern; and correcting means for correcting image distortion occurring between adjacent image blocks using relative sizes of the scanned image and the reference pattern;

wherein the magnification factor is calculated by said calculating means in accordance with the following equation:

$$E = S + N\left(\frac{x}{y}\right) - 1 + \alpha$$

where E is an end point of a processed image,
where S is a start point of the scanned image,
where y is a number of dots representing the vertical dimension of the scanned image,
where x is a number of dots representing the predetermined vertical dimension of the reference pattern,
where N is a pixel number of said scanning means, and
where α is a compensating value according to a drive delay of said scanning means.

8. The apparatus as claimed in claim 7, wherein a number of dots making up the predetermined vertical dimension of the reference pattern is fewer than a number of pixels of said scanning means.

9. The apparatus as claimed in claim 7, wherein said calculating means performs calculations in accordance with N(y/x), where y is a number of dots representing the vertical dimension of the scanned image,
where x is a number of dots representing the predetermined vertical dimension of the reference pattern, and
where N is a pixel number of said scanning means.

10. The apparatus as claimed in claim 7, wherein said correcting means uses the magnification factor calculated by said calculating means to perform selective image-processing on scanning data, whereby to compensate for the image distortion occurring between the adjacent image blocks.

11. The apparatus as claimed in claim 7, wherein the drive quantity is adjusted by said correcting means in accordance with N(x/y), where y is a number of dots representing the vertical dimension of the scanned image,
where x is a number of dots representing the predetermined vertical dimension of the reference pattern, and
where N is a pixel number of said scanning means.

12. The apparatus as claimed in claim 7, wherein said scanning means comprises a scanner module which includes an optical sensor.

13. The apparatus as claimed in claim 12, wherein said calculating mans comprises a data processor connected to said optical sensor.

14. The apparatus as claimed in claim 7, wherein said calculating means comprises a data processor.

15. The apparatus as claimed in claim 7, wherein said correcting means adjusts a drive quantity of a line feed motor to control a transfer distance of the scanned object, whereby to compensate for the image distortion occurring between the adjacent image blocks.

16. A method for compensating for inter-block image distortion in a shuttle scanner having a scanner module, comprising the steps of:

scanning a reference pattern having a predetermined vertical dimension;

calculating a magnification factor of the scanner module by comparing a vertical dimension of a scanned image with the predetermined vertical dimension of the reference pattern; and correcting image distortion occurring between adjacent image blocks using relative sizes of the scanned image and the reference pattern;

wherein the magnification factor is calculated in accordance with the following equation:

$$E = S + N\left(\frac{x}{y}\right) - 1 + \alpha$$

where E is an end point of a processed image,
where S is a start point of the scanned image,
where y is a number of dots representing the vertical dimension of the scanned image,
where x is a number of dots representing the predetermined vertical dimension of the reference pattern,
where N is a pixel number of an optical sensor of the scanner module, and
where α is a compensating value according to a drive delay of the scanner.

17. The method as claimed in claim 16, wherein a number of dots making up the predetermined vertical dimension of the reference pattern is fewer than a number of pixels of an optical sensor in the scanner module.

18. The method as claimed in claim 16, wherein said calculating step is performed in accordance with N(y/x), where y is a number of dots representing the vertical dimension of the scanned image,
where x is a number of dots representing the predetermined vertical dimension of the reference pattern, and
where N is a pixel number of the scanner.

19. The method as claimed in claim 16, wherein said correcting step uses the calculated magnification factor to perform selective image-processing on scanning data, whereby to compensate for the image distortion occurring between the adjacent image blocks.

20. The method as claimed in claim 16, wherein said correcting step adjusts a drive quantity of a line feed motor to control a transfer distance of the scanned object, whereby to compensate for the image distortion occurring between the adjacent image blocks.

21. The method as claimed in claim 20, wherein the drive quantity is calculated in accordance with N(x/y), where y is a number of dots representing the vertical dimension of the scanned image, where x is a number of dots representing the predetermined vertical dimension of the reference pattern, and where N is a pixel number of the scanner.

22. An apparatus for compensating for inter-block image distortion in a shuttle scanner having a scanner module, comprising:

scanning means for scanning a reference pattern having a predetermined vertical dimension;

calculating means for calculating a magnification factor of said scanning means by comparing a vertical dimension of a scanned image with the predetermined vertical dimension of the reference pattern; and correcting means for correcting image distortion occurring between adjacent image blocks using relative sizes of the scanned image and the reference pattern;

wherein the magnification factor is calculated by said calculating means in accordance with the following equation:

$$E = S + N\left(\frac{x}{y}\right) - 1 + \alpha$$

where E is an end point of a processed image, where S is a start point of the scanned image, where y is a number of dots representing the vertical dimension of the scanned image, where x is a number of dots representing the predetermined vertical dimension of the reference pattern, where N is a pixel number of said scanning means, and where $\alpha$ is a compensating value according to a drive delay of said scanning means.

23. The apparatus as claimed in claim 22, wherein a number of dots making up the predetermined vertical dimension of the reference pattern is fewer than a number of pixels of said scanning means.

24. The apparatus as claimed in claim 22, wherein said calculating means performs calculations in accordance with N(y/x), where y is a number of dots representing the vertical dimension of the scanned image, where x is a number of dots representing the predetermined vertical dimension of the reference pattern, and where N is a pixel number of said scanning means.

25. The apparatus as claimed in claim 22, wherein said correcting means uses the magnification factor calculated by said calculating means to perform selective image-processing on scanning data, whereby to compensate for the image distortion occurring between the adjacent image blocks.

26. The apparatus as claimed in claim 22, wherein said correcting means adjusts a drive quantity of a line feed motor to control a transfer distance of the scanned object, whereby to compensate for the image distortion occurring between the adjacent image blocks.

27. The apparatus as claimed in claim 26, wherein the drive quantity is adjusted by said correcting means in accordance with N(x/y), where y is a number of dots representing the vertical dimension of the scanned image, where x is a number of dots representing the predetermined vertical dimension of the reference pattern, and where N is a pixel number of said scanning means.

28. The apparatus as claimed in claim 22, wherein said scanning means comprises a scanner module which includes an optical sensor.

29. The apparatus as claimed in claim 28, wherein said calculating mans comprises a data processor connected to said optical sensor.

30. The apparatus as claimed in claim 22, wherein said calculating means comprises a data processor.

* * * * *